July 1, 1958 R. L. KOEHLER 2,841,650

TELEPHONE ALERT SYSTEM

Filed Nov. 20, 1956 2 Sheets-Sheet 1

INVENTOR.
Robert L. Koehler

July 1, 1958 R. L. KOEHLER 2,841,650

TELEPHONE ALERT SYSTEM

Filed Nov. 20, 1956 2 Sheets-Sheet 2

INVENTOR.
Robert L. Koehler 2,841,650
Patented July 1, 1958

1

2,841,650

TELEPHONE ALERT SYSTEM

Robert L. Koehler, Canoga Park, Calif., assignor to Koiled Kords, Incorporated, New Haven, Conn., a corporation of Connecticut Application November 20, 1956, Serial No. 623,349

10 Claims. (Cl. 179—2)

The present invention relates to a signal alert system, and particularly to such a system whereby an alert signal is distributed over telephone lines to a plurality of receiving points without disturbing the normal operations on any of the lines.

In my Patent No. 2,568,342 of September 18, 1951, I disclose and claim a method of and system for transmitting longitudinal, characterized signal currents from the various subset locations of a telephone system to a central point or points. The present invention uses the basic principles of this prior system and provides a reliable and dependable transmitter and receiver for alerting equipment. At the transmitter, a standby oscillator-amplifier unit is provided which is automatically placed on the line when the voltage of the operating oscillator-amplifier drops below a predetermined value. At the various receiving subsets, the proper operating condition is indicated, the receiving unit providing both an audible and visible indication of the reception of a signal, the visible indication remaining to show reception of a signal during the absence of an observer. When the signal is observed, it may be eliminated and the receiver restored to reception condition by a reset switch.

The principal object of the invention, therefore, is to facilitate the alerting of a large number of stations over existing telephone circuits without interference with normal telephone operation.

Another object of the invention is to provide an improved system for alerting a large number of stations over existing telephone circuits.

A further object of the invention is to provide an improved system for alerting a large number of stations with a maximum factor of dependable operation.

Figure 1A:
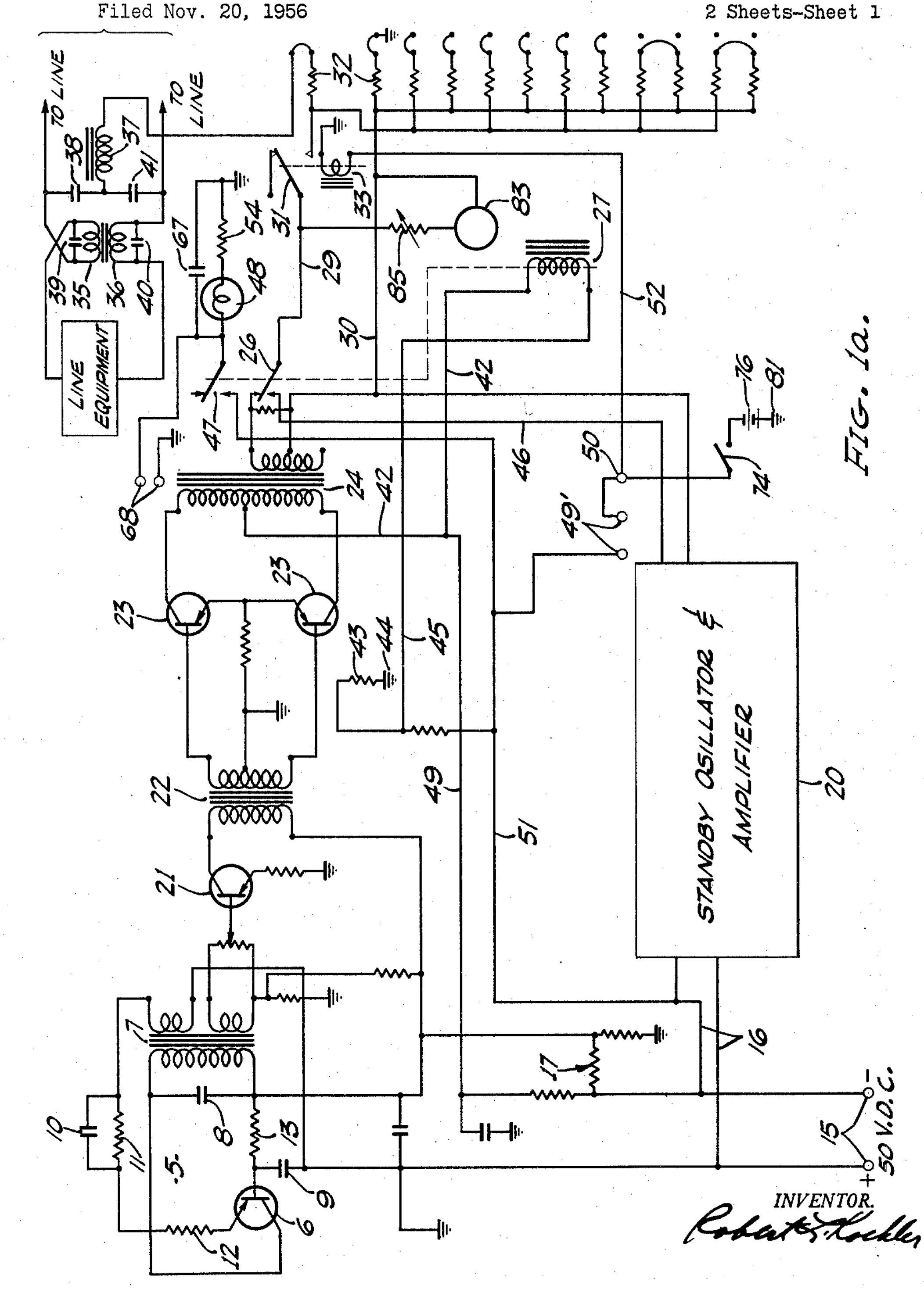
Figure 1B:
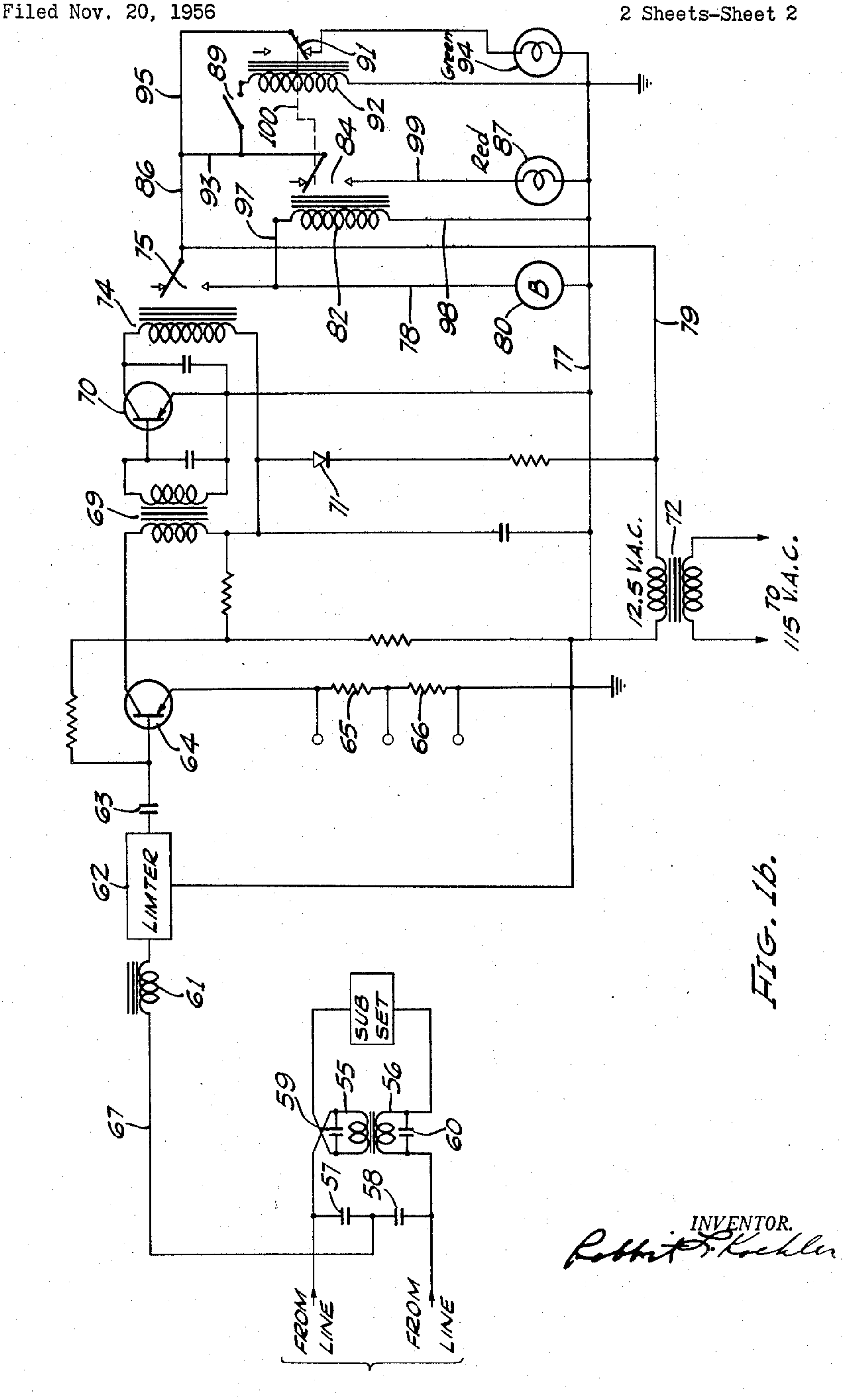

A better understanding of this invention may be had from the following detailed description when read in connection with the accompanying drawings, in which:

Fig. 1*a* is a schematic circuit of the transmitting terminal of a system embodying the invention; and Fig. 1*b* is a schematic circuit of one of the receiving terminals of a system embodying the invention.

Referring, now, to the drawings, a transistorized oscillator is represented at 5 with a transistor 6, a feedback and output transformer 7, and tuning condensers 8, 9, and 10 with respective resistors 11, 12, and 13. The oscillator is eneregized from a 50 volt direct current source connected to terminals 15 over a voltage divider 17.

The output of the oscillator 5 is connected over a transistor amplifier 21 and a transformer 22 to pushpull power transistors 23, the output of which is connected to the primary of a transformer 24. The secondary of the transformer 24 is normally connected to a swinger 26 of a relay 27, conductors 29 and 30 and swinger 31 of relay 33. A plurality of terminals, indicated at 32, are connectable to a plurality of telephone pairs. The lower two pairs of terminals are shown short-circuited to indicate that different numbers of telephone lines may be connected to transformer 24, the other terminals being shorted to provide a constant load for the amplifier 23 at all times.

2

For clarity only, one telephone line pair is shown connected to transformer 24, other pairs being connected in a similar manner. The line pair shown has an electrical band acceptor and rejector filter composed of windings 35 and 36 and condensers 39 and 40, as disclosed in my copending application, Ser. No. 603,699, filed August 13, 1956. A coupling coil is shown at 37 along with coupling condensers 38 and 41 for impressing the signal as longitudinal currents on the line pair.

The power supply connected to terminals 15 feeds a standby oscillator-amplifier unit 20 over conductors 16, the unit 20 including an oscillator similar to oscillator 5, amplifiers similar to amplifiers 21 and 23, and an output transformer similar to output transformer 24.

The above transmitter equipment is particularly dependable and well suited for supplying an alert signal. That is, when the level from oscillator 5 drops in the neighborhood of 6 db at the transformer 24, the standby oscillator unit 20 will be automatically connected into the system. This is accomplished by a circuit from the center tap of the primary of transformer 24 over conductor 42, the winding of relay 27, conductor 45, and resistor 43, to gorund 44. The 6 db reduction in level at the transformer 24 permits 30 volts negative to be impressed on the winding of relay 27 over conductor 49 from voltage divider 17 to energize this relay which will switch the swinger 26 from its upper to its lower contacts. Thus, the output of oscillator 20 is connected over conductor 46 to conductor 29 and to the various line terminals indicated at 32. Simultaneously, the relay 27 closes contacts 47 which places energy on a lamp 48 over conductor 51 from the power supply terminals 15 to indicate that the standby oscillator is on the line. Protecting resistor 54 and condenser 67 are connected in the lamp circuit. Terminals 68 may be connected to an audible indicator if desired.

To manually control the impression of an alert signal on the line pairs, a keying relay 33, actuating swinger 31, is energizable over conductors 52 and 51 when a switch across terminals 49′ is closed. This switch may be located at the equipment. To energize the relay 33 from a remote point, a circuit may extend from terminal 50 through a remote switch 74, battery 76 to ground 81. A level meter 83 with its calibration resistor 85 is connected across the output of transformer 24.

Referring, now, to the receiving equipment of the alert system, one of many subscriber stations is illustrated in Fig. 1*b*. The incoming signal is taken from the line over conductor 67, coupling condensers 57 and 58, and coil 61 to a pad or limiter 62. At the subscriber's terminal is a longitudinal band acceptor-rejector filter composed of windings 55 and 56 and condensers 59 and 60. From the limiter 62, the signal is transmitted through a blocking condenser 63 to a transistor-amplifier 64 having resistors 65 and 66 in its circuit, which may be shorted to increase the gain of the transistor-amplifier. The output of transistor-amplifier 64 is impressed over a transformer 69 on a transistor-amplifier 70, which is energized along with transistor-amplifier 64 from a rectifier 71 connected to a 115 volt A. C. source over transformer 72.

The output of transistor-amplifier 70 is impressed on a relay 74 which when energized will close its contacts 75. The closing of contacts 75 completes an energization circuit from the transformer 72 over conductor 77, conductor 78, closed contacts 75 and conductor 79 to energize a buzzer or bell 80. Simultaneously, energy from the transformer 72 is impressed over the same circuit plus conductors 97 and 98 on a relay 82 to close its contacts 84, this relay being a mechanical locking relay so that the contacts 84 remain closed after the relay 82 is deenergized. The energization of the buzzer 80 provides an audible signal, and the closing of contacts 84 energizes a red lamp 87 to provide a visual indication, lamp 87 being energized over conductor 79, conductor 86, conductor 93, closed contacts 84, conductor 99, and conductor 77.

To indicate that the receiving system is in normal or operative receiving condition, a green lamp 94 is energized over conductor 77, normally closed contacts 91, conductor 95, conductor 86, and conductor 79. Upon the energization of relay 82, contacts 91 are broken to extinguish the green lamp 94, since, as shown by the dotted line 100, the swingers of relays 82 and 92 are mechanically interconnected so that when contacts 84 are closed, contacts 91 are opened.

In the operation of the alert system, a signal is received for a predetermined length of time, after which it is discontinued. The discontinuance of the signal will break contacts 75 de-energizing buzzer 80. However, lamp 87 will be maintained energized since the contacts 84 are locked closed. Now, when the energized red lamp is observed, the observer knows that a signal has been received and he may then close a reset switch 89, which will energize the relay 92 to unlock the contacts 84 and make contacts 91 to indicate that the receiving circuit is again in normal operative condition.

Thus, an alert system is provided with maximum operating efficacy and dependability, since the transmitter automatically shifts to a standby unit and the receiver is provided with an indicator to show that it is in normal operative condition and an indicator to show the receipt of a signal during the absence of an observer. The alert signal can be distributed to many points simultaneously, all of which is accomplished over normal subscriber telephone lines without disturbing the normal operation thereof.

I claim:

1. An alert system comprising a transmitter for generating a signal to be transmitted, an output circuit for said transmitter, a plurality of telephone lines connectable to said output circuit, and a receiver of said signal at the end of each of said lines, each of said receivers including means for indicating the operative condition of said receiver and means for indicating the reception of said signal after the reception of said signal has discontinued.

2. An alert system in accordance with claim 1 in which said transmitter includes a pair of units, each having a signal generator and amplifier, and automatic means for switching from the output circuit of one of said units to the other of said pair of units when the output of said one unit decreases a predetermined amount.

3. An alert system in accordance with claim 1 in which said means for indicating the reception of said signal includes an audible indicator and a visible indicator, means for de-energizing said audible indicator after the cessation of said signal, and means for maintaining said visible indicator energized after the cessation of said signal.

4. An alert system in accordance with claim 3 in which said last-mentioned means is a mechanically locking relay, said relay de-energizing said means for indicating the operative condition of said receiver upon actuation of said means for indicating the reception of said signal.

5. An alert system for use over telephone lines without interference with the normal use of said lines comprising a transmitter for generating a signal for impression on said lines, means for impressing said signal as longitudinal currents over said lines, and a receiver of said signal at the end of each of said lines, each of said receivers being adapted to detect the longitudinal currents of said signal, each of said receivers including means for indicating the operative condition of said receiver, and the reception of said signal after said signal has ceased, said transmitter including means for generating a pair of signals, said impressing means including means for impressing only one of said signals on said lines, and automatic means for disconnecting said first signal from said lines and connecting said second signal to said lines when said first signal has decreased a predetermined amount.

6. An alert system for use over telephone lines without interference with the normal use of said lines comprising a transmitter for generating a signal for impression on said lines, means for impressing said signal as longitudinal currents over said lines, and a receiver of said signal at the end of each of said lines, each of said receivers being adapted to detect the longitudinal currents of said signal, each of said receivers including means for indicating the operative condition of said receiver, and the reception of said signal after said signal has ceased, said last-mentioned means including a power supply, a visible indicator normally energized from said power supply, an audible indicator and visible indicator energized at the reception of said signal, and means for de-energizing said visible indicator normally energized from said power supply at the reception of said signal and for maintaining said other visible indicator energized after the cessation of said signal.

7. An alert system in accordance with claim 6 in which said last-mentioned means includes a pair of relays having interlocked swingers, one of said relays mechanically locking its swinger closed and the swinger of said other relay open upon energization of said one relay, the energization of said other relay unlocking the swinger of said one relay and closing the swinger of said other relay.

8. A system for alerting a plurality of stations simultaneously over telephone lines without substantial interference with the normal operation of said lines comprising means for generating a signal at a central office for said lines, means for transmitting and receiving said signal as longitudinal currents over said lines, and means for audibly and visibly indicating the reception of said signal at the ends of said lines during the transmission of said signal, said last-mentioned means including means for discontinuing the audible indication of the reception of said signal while maintaining the visible indication thereof after the cessation of said signal.

9. A system in accordance with claim 8 in which means are provided for indicating the operative condition of said last-mentioned means, said means including a relay for discontinuing the indication of the operative condition of said last-mentioned means when the reception of said signal is indicated.

10. A system in accordance with claim 8 in which means are provided for generating a pair of signals, one of said signals being transmitted at any one time, a predetermined reduction in amplitude of said transmitted signal automatically shifting to said other signal for transmission.

References Cited in the file of this patent

UNITED STATES PATENTS

| | | |
|---|---|---|
| 2,568,342 | Koehler | Sept. 18, 1951 |
| 2,616,972 | McNutt | Nov. 4, 1952 |
| 2,780,673 | Singel | Feb. 5, 1957 |